United States Patent
Spivey et al.

(10) Patent No.: US 6,173,812 B1
(45) Date of Patent: Jan. 16, 2001

(54) RECREATIONAL VEHICLE FIRE ESCAPE SYSTEM

(76) Inventors: Gerald R. Spivey; Betty J. Spivey, both of 106 Birmingham Ave., Streator, IL (US) 61364

( * ) Notice: Under 35 U.S.C. 154(b), the term of this patent shall be extended for 0 days.

(21) Appl. No.: 09/428,888

(22) Filed: Oct. 28, 1999

(51) Int. Cl.$^7$ .................................................. B60R 3/00
(52) U.S. Cl. ............................ 182/88; 280/166; 296/156
(58) Field of Search ........................ 182/88, 127, 95, 182/97; 280/166, 163; 296/156

(56) References Cited

U.S. PATENT DOCUMENTS

| | | | | |
|---|---|---|---|---|
| 2,863,594 | * | 12/1958 | Shafer | 182/88 |
| 3,392,992 | * | 7/1968 | BAker | 296/156 |
| 3,469,654 | * | 9/1969 | Dohaman | 182/88 |
| 3,580,599 | * | 5/1971 | Dodgen | 296/156 |
| 3,645,557 | * | 2/1972 | Aldropp | 182/88 |
| 3,796,456 | * | 3/1974 | Bergeson | 182/88 |
| 4,347,638 | * | 9/1982 | Weaver | 182/88 |
| 4,869,030 | * | 9/1989 | Clark | 182/88 |
| 5,103,934 | * | 4/1992 | Brooks | 182/84 |
| 5,143,324 | * | 9/1992 | Cornelieus | 182/88 |
| 5,228,707 | * | 7/1993 | Yoder | 182/88 |

* cited by examiner

*Primary Examiner*—Alvin Chin-Shue

(57) ABSTRACT

A recreational vehicle fire escape system for providing a user with a safe passage from the escape window to the ground includes a pair of tracks designed for coupling to a camper on an underside of an elevated compartment extending from the camper. A platform is slidably attached to the track for extending outwardly from the elevated compartment. A ladder is extended from the platform and is pivotable relative to the platform such that a distal end of the ladder is designed for positioning against a surface below the platform. The platform is positioned near an egress window of the camper such that the platform and ladder are designed for facilitating exit of a user through the egress window.

1 Claim, 3 Drawing Sheets

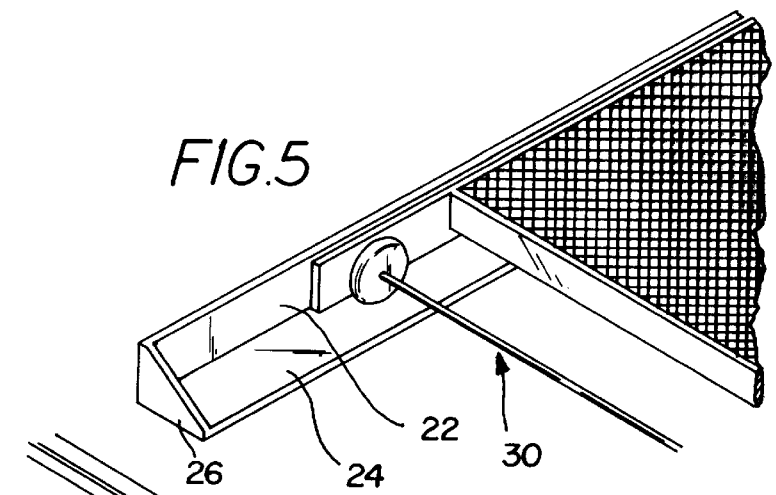
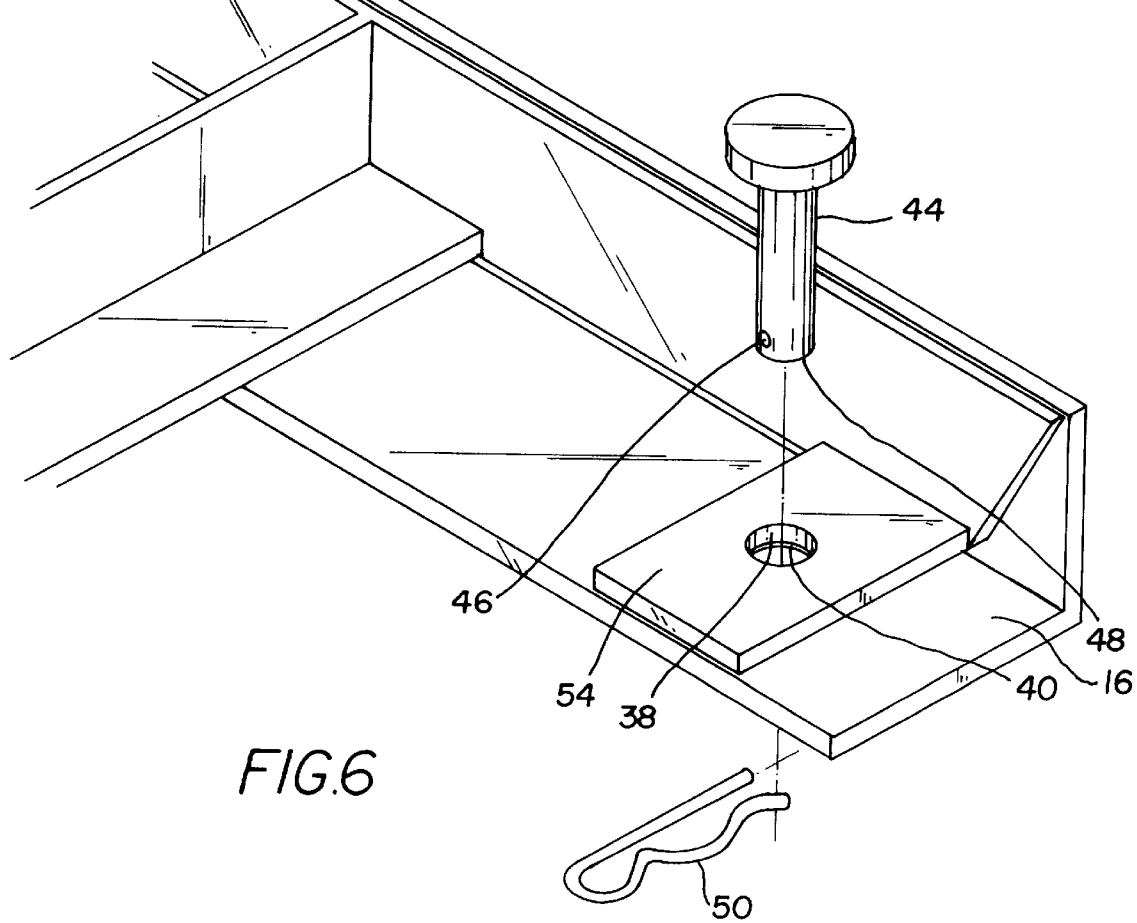

RECREATIONAL VEHICLE FIRE ESCAPE SYSTEM

BACKGROUND OF THE INVENTION

1. Field of the Invention

The present invention relates to fire escape systems for recreational vehicles and more particularly pertains to a new recreational vehicle fire escape system for providing a user with a safe passage from the escape window to the ground.

2. Description of the Prior Art

The use of fire escape systems for recreational vehicles is known in the prior art. More specifically, fire escape systems for recreational vehicles heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 3,796,456; 3,469,654; 392,744; 3,997,026; 4,476,957; and 3,946,833.

While these devices fulfill their respective, particular objectives and requirements, the aforementioned patents do not disclose a new recreational vehicle fire escape system. The inventive device includes 13. A fire escape system for a camper of the type including an elevated compartment extending outwardly from a main cabin area, the elevated compartment including an egress window, the fire escape system includes a pair of substantially parallel tracks designed for coupling to the camper on an underside of the elevated compartment. A platform slidably attached to the track for extending outwardly from the elevated compartment. A ladder, the ladder is extended from the platform, the ladder is pivotable relative to the platform such that a distal end of the ladder is designed for positioning against a surface below the platform. The platform is substantially vertically aligned with the egress window of the elevated compartment such that the platform is designed for facilitating exit of a user through the egress window.

The track is generally L-shaped, each track including a side wall and a supporting flange extending outwardly from the side wall, each the support flange is for supporting the platform when the platform is in a retracted position defined by the platform is positioned in the tracks beneath the elevated compartment, each the support flange further is for supporting the ladder when the ladder is in a retracted position defined by the ladder is positioned in the tracks and beneath the elevated compartment. The track including a stopping portion extending between an end of the sidewall and an associated end of the support flange.

The platform including a pair of roller connection members, each roller connection member extending outwardly from a respective side of the platform in alignment with an associated one of the pair of tracks whereby a distal end of the roller connection member is positioned for contacting an associated one of the stopping portions. A roller assembly extending between the roller connection members such that the roller assembly is supported by the support flanges of the pair of tracks for facilitating extension and retraction of the platform. The platform including a pair of ladder connection members extending outwardly from the platform, the ladder is pivotally attached to the ladder connection members. Each of the ladder connection members including an upper flange extending orthogonally outward from the platform such that the upper flange is extends past a proximal end of the ladder when the ladder is attached to the ladder connection members the upper flange is coplanar with an upper surface of the platform for preventing the distal end of the ladder from pivoting above a horizontal plane in which the platform lies.

The tracks each including a respective securing aperture; the ladder including a pair of holes, the holes is alignable with the securing apertures when the ladder is in the retracted position.

A fastener assembly for coupling through the securing apertures and ladder holes for holding the ladder in the retracted position during periods of non-use. The fastener assembly including a pin member for inserting through an associated aligned securing aperture and ladder hole, the pin member including a receiving hole extending through a distal end of the pin member. A clip member insertable through the receiving hole whereby the pin member is engagable to the ladder and the track for holding the ladder in a static position.

The ladder including a pair spaced legs and a pair of pin receiver plates, each pin receiver plate extending outwardly from an associated one of the legs, each the hole in the ladder is located in a respective one of the pin receiver plates. A plurality of generally L-shaped mounting brackets designed for coupling the tracks to the underside of the elevated compartment of the camper.

In these respects, the recreational vehicle fire escape system according to the present invention substantially departs from the conventional concepts and designs of the prior art, and in so doing provides an apparatus primarily developed for the purpose of providing a user with a safe passage from the escape window to the ground.

SUMMARY OF THE INVENTION

In view of the foregoing disadvantages inherent in the known types of fire escape systems for recreational vehicles now present in the prior art, the present invention provides a new recreational vehicle fire escape system construction wherein the same can be utilized for providing a user with a safe passage from the escape window to the ground.

The general purpose of the present invention, which will be described subsequently in greater detail, is to provide a new recreational vehicle fire escape system apparatus and method which has many of the advantages of the fire escape systems for recreational vehicles mentioned heretofore and many novel features that result in a new recreational vehicle fire escape system which is not anticipated, rendered obvious, suggested, or even implied by any of the prior art fire escape systems for recreational vehicles, either alone or in any combination thereof.

To attain this, the present invention generally comprises a fire escape system for a camper of the type including an elevated compartment extending outwardly from a main cabin area, the elevated compartment including an egress window, the fire escape system includes a pair of substantially parallel tracks designed for coupling to the camper on an underside of the elevated compartment. A platform slidably attached to the track for extending outwardly from the elevated compartment. A ladder, the ladder is extended from the platform, the ladder is pivotable relative to the platform such that a distal end of the ladder is designed for positioning against a surface below the platform. The platform is substantially vertically aligned with the egress window of the elevated compartment such that the platform is designed for facilitating exit of a user through the egress window.

The track is generally L-shaped, each track including a side wall and a supporting flange extending outwardly from the side wall, each the support flange is for supporting the platform when the platform is in a retracted position defined by the platform is positioned in the tracks beneath the elevated compartment, each the support flange further is for supporting the ladder when the ladder is in a retracted position defined by the ladder is positioned in the tracks and beneath the elevated compartment. The track including a stopping portion extending between an end of the sidewall and an associated end of the support flange.

The platform including a pair of roller connection members, each roller connection member extending outwardly from a respective side of the platform in alignment with an associated one of the pair of tracks whereby a distal end of the roller connection member is positioned for contacting an associated one of the stopping portions. A roller assembly extending between the roller connection members such that the roller assembly is supported by the support flanges of the pair of tracks for facilitating extension and retraction of the platform. The platform including a pair of ladder connection members extending outwardly from the platform, the ladder is pivotally attached to the ladder connection members. Each of the ladder connection members including an upper flange extending orthogonally outward from the platform such that the upper flange is extends past a proximal end of the ladder when the ladder is attached to the ladder connection member, the upper flange is coplanar with an upper surface of the platform for preventing the distal end of the ladder from pivoting above a horizontal plane in which the platform lies.

The tracks each including a respective securing aperture; the ladder including a pair of holes, the holes is alignable with the securing apertures when the ladder is in the retracted position.

A fastener assembly for coupling through the securing apertures and ladder holes for holding the ladder in the retracted position during periods of non-use. The fastener assembly including a pin member for inserting through an associated aligned securing aperture and ladder hole, the pin member including a receiving hole extending through a distal end of the pin member. A clip member insertable through the receiving hole whereby the pin member is engagable to the ladder and the track for holding the ladder in a static position.

The ladder including a pair spaced legs and a pair of pin receiver plates, each pin receiver plate extending outwardly from an associated one of the legs, each the hole in the ladder is located in a respective one of the pin receiver plates. A plurality of generally L-shaped mounting brackets designed for coupling the tracks to the underside of the elevated compartment of the camper.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and is practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new recreational vehicle fire escape system apparatus and method which has many of the advantages of the fire escape systems for recreational vehicles mentioned heretofore and many novel features that result in a new recreational vehicle fire escape system which is not anticipated, rendered obvious, suggested, or even implied by any of the prior art fire escape systems for recreational vehicles, either alone or in any combination thereof.

It is another object of the present invention to provide a new recreational vehicle fire escape system, which may be easily and efficiently manufactured and marketed.

It is a further object of the present invention to provide a new recreational vehicle fire escape system, which is of a durable and reliable construction.

An even further object of the present invention is to provide a new recreational vehicle fire escape system which is susceptible of a low cost of manufacture with regard to both materials and labor, and which accordingly is then susceptible to low prices of sale to the consuming public, thereby making such recreational vehicle fire escape system economically available to the buying public.

Still yet another object of the present invention is to provide a new recreational vehicle fire escape system which provides in the apparatuses and methods of the prior art some of the advantages thereof, while simultaneously overcoming some of the disadvantages normally associated therewith.

Still another object of the present invention is to provide a new recreational vehicle fire escape system for providing a user with a safe passage from the escape window to the ground.

Yet another object of the present invention is to provide a new recreational vehicle fire escape system which includes a fire escape system for a camper of the type including an elevated compartment extending outwardly from a main cabin area, the elevated compartment including an egress window, the fire escape system includes a pair of substantially parallel tracks designed for coupling to the camper on an underside of the elevated compartment.

Still yet another object of the present invention is to provide a new recreational vehicle fire escape system that allows a user to safely exit the upper compartment bedroom window in case of fire or if the main door is blocked.

Even still another object of the present invention is to provide a new recreational vehicle fire escape system that this recreational vehicle fire escape system can prevent injury to user trying to exit from the upper compartment bedroom window.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a partial top perspective view of the present invention.

FIG. 6 is an exploded view of the ladder to the track of the present invention.

DESCRIPTION OF THE PREFERRED EMBODIMENT

Figure 1:
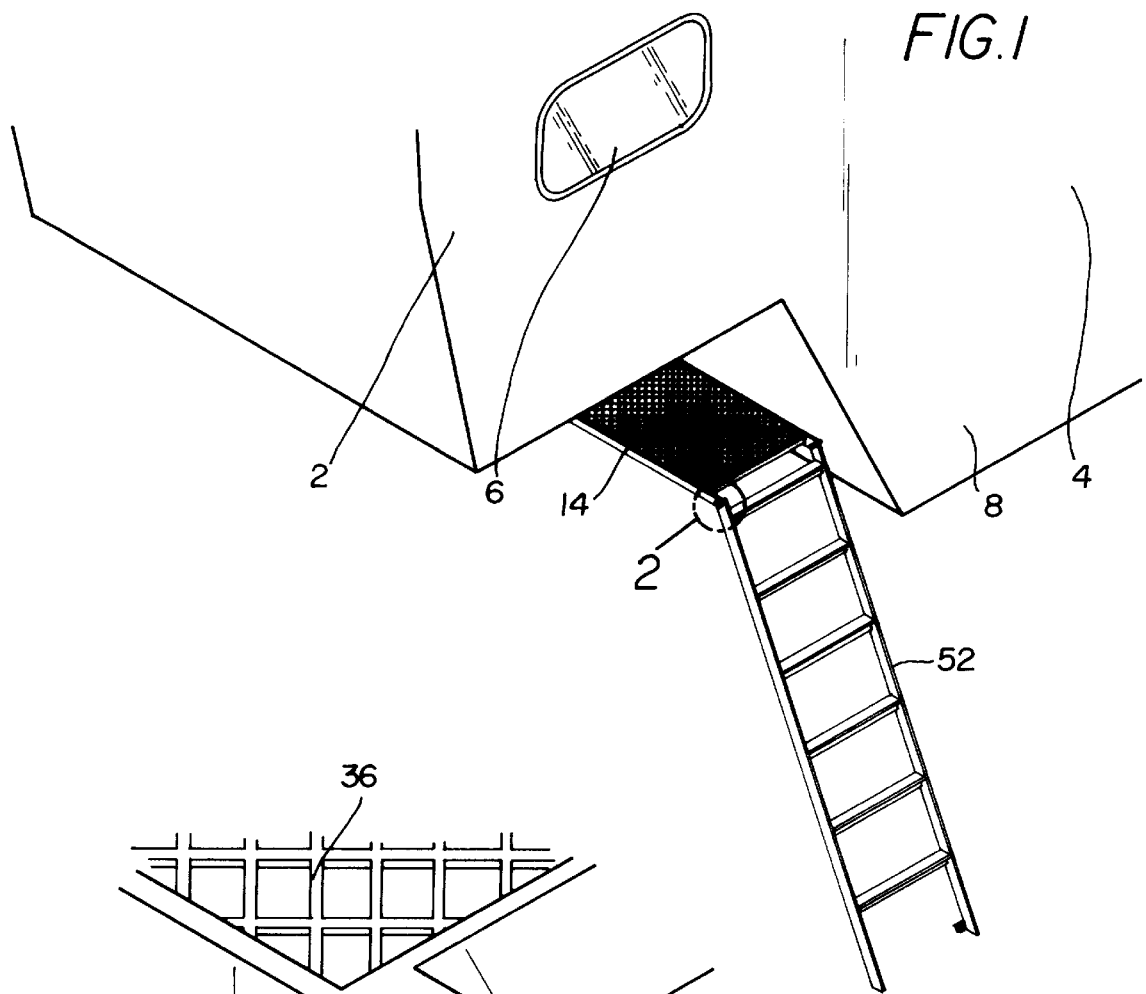
FIG. 1 is a perspective view of a new recreational vehicle fire escape system according to the present invention.
Figure 2:
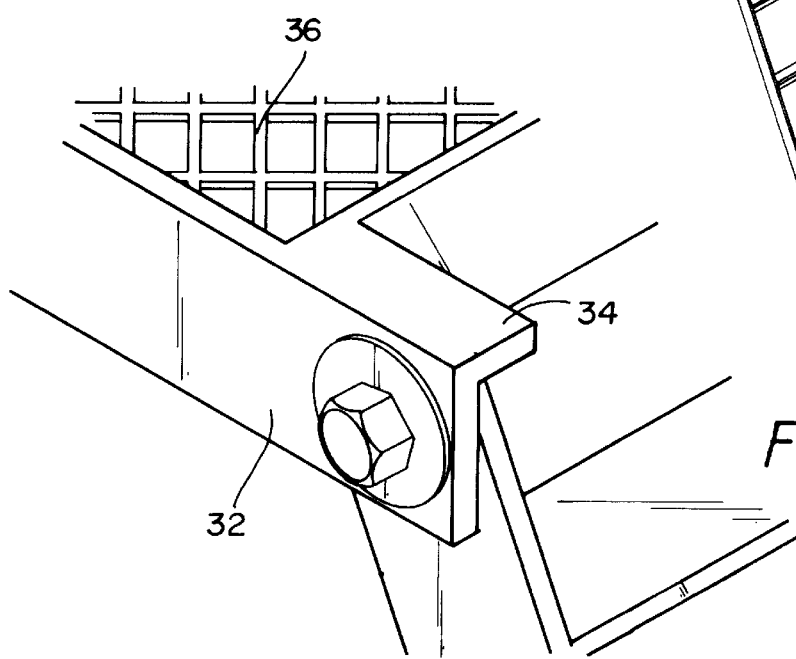
FIG. 2 is an enlarged perspective view of the present invention of the area designated by 2 in FIG. 1.
Figure 3:
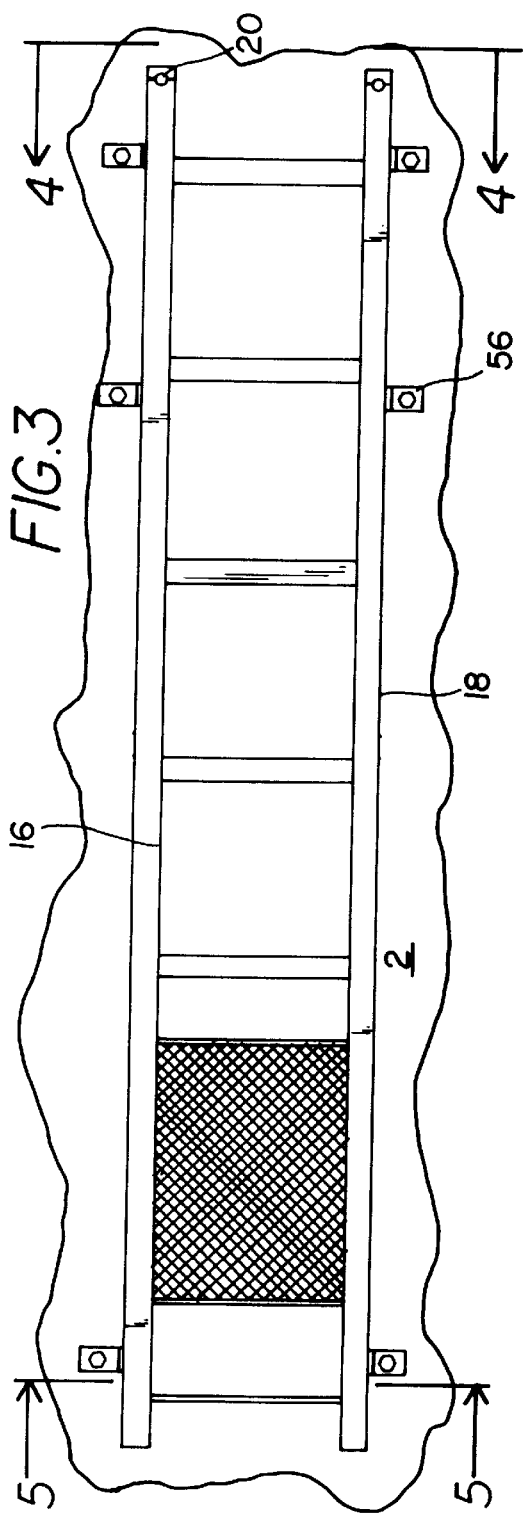
FIG. 3 is a bottom view of the present invention.
Figure 4:
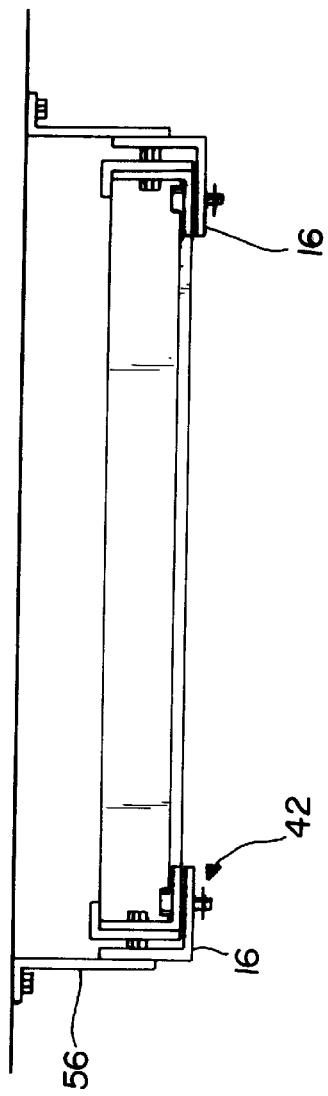
FIG. 4 is a end view of the present invention.

With reference now to the drawings, and in particular to FIGS. 1 through 6 thereof, a new recreational vehicle fire escape system embodying the principles and concepts of the present invention and generally designated by the reference numeral 10 will be described.

As best illustrated in FIGS. 1 through 6, the recreational vehicle fire escape system 10 is generally designed for a camper of the type including an elevated compartment 2 extending outwardly from a main cabin area 4, the elevated compartment 2 includes an egress window 6. The fire escape system 10 includes a pair of substantially parallel tracks 16 designed for coupling to the camper 8 on an underside of the elevated compartment 2. A platform 14 slidably attached to the track 16 for extending outwardly from the elevated compartment 2. A ladder 18 is extended from the platform 14, the ladder 18 is pivotable relative to the platform 14 such that a distal end 20 of the ladder is designed for positioning against a surface below the platform 14. The platform 14 is substantially vertically aligned with the egress window 6 of the elevated compartment 2 such that the platform 14 is designed for facilitating exit of a user through the egress window 6.

Each track 16 is generally L-shaped and includes a side wall 22 and a supporting flange 24 extending outwardly from the side wall 22. Each support flange 24 is designed for supporting the platform 14 when the platform 14 is in a retracted position defined by the platform 14 being positioned in the tracks 16 beneath the elevated compartment 2. Each support flange 24 further is for supporting the ladder 18 when the ladder 18 is in a retracted position defined by the ladder 18 being positioned in the tracks 16 and beneath the elevated compartment 2. The track 16 includes a stopping portion 26 extending between an end of the sidewall 22 and an associated end of the support flange 24.

The platform 14 includes a pair of roller connection members 28, each roller connection member 28 extending outwardly from a respective side of the platform 14 in alignment with an associated one of the pair of tracks 16. Thus, a distal end 20 of the roller connection member 28 is positioned for contacting an associated one of the stopping portions 26. A roller assembly 30 extends between the roller connection members 28 such that the roller assembly 30 is supported by the support flanges 24 of the pair of tracks 16 for facilitating extension and retraction of the platform 14. The platform 14 includes a pair of ladder connection members 32 extending outwardly from the platform 14. The ladder 18 is pivotally attached to the ladder connection members 32. Each of the ladder connection members 32 includes an upper flange 34 extending orthogonally outward from the platform 14 such that the upper flange 34 extends past a proximal end of the ladder 18 when the ladder 18 is attached to the ladder connection member 32. The upper flange 34 is coplanar with an upper surface 36 of the platform 14 for preventing the distal end 20 of the ladder 18 from pivoting above a horizontal plane in which the platform 14 lies.

The tracks 16 each include a respective securing aperture 40. The ladder 18 includes a pair of holes 38, the holes 38 being alignable with the securing apertures 40 when the ladder 18 is in the retracted position.

A fastener assembly 42 is provided for coupling through the securing apertures 40 and ladder holes 38 for holding the ladder 18 in the retracted position during periods of non-use. The fastener assembly 42 includes a pin member 44 for inserting through an associated aligned securing aperture 40 and ladder hole 38. The pin member 44 includes a receiving hole 46 extending through a distal end 48 of the pin member 44. A clip member 50 is insertable through the receiving hole 46 whereby the pin member 44 is engagable to the ladder 18 and the track 16 for holding the ladder 18 in a static position.

The ladder 18 also includes a pair of spaced legs 52 and a pair of pin receiver plates 54. Each pin receiver plate 54 extends outwardly from an associated one of the legs 52. Each hole in the ladder is located in a respective one of the pin receiver plates 54. A plurality of generally L-shaped mounting brackets 56 are provided and are designed for coupling the tracks 16 to the underside of the elevated compartment 2 of the camper 8.

In use, the recreational vehicle fire escape system slides out from a slide mount underneath the camper and the end of device rests on the ground. This enables the user a to safely exit from the elevated bedroom compartment down to the ground outside the recreational vehicle.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A fifth wheel camper with a fire escape system comprising:

a fifth wheel camper having an elevated compartment extending outwardly from a main cabin area, the elevated compartment having a bottom wall that is elevated with respect to a floor of the main cabin area, the elevated compartment having an egress window in a side wall of the elevated compartment; and a fire escape system comprising:
a pair of substantially parallel tracks mounted on an underside of the bottom wall of the elevated compartment;
a platform slidably coupled to said track for extending outwardly beyond the side wall of said elevated compartment;
a ladder extended from said platform, said ladder being pivotable relative to said platform such that a distal end of the ladder is adapted for positioning against a surface below said platform;
said platform being substantially vertically aligned with the egress window of the elevated compartment such that the platform is adapted for facilitating exit of a user through the egress window;
each said track being generally L-shaped, each track having a side wall and a supporting flange extending outwardly from said side wall, each said support flange supporting said platform when said platform is in a retracted position defined by said platform being positioned in said tracks beneath the elevated compartment, each said support flange further is for supporting said ladder when said ladder is in a retracted position defined by said ladder is positioned in said tracks and beneath said elevated compartment;
each said track having a stopping portion extending between an end of said side wall and an associated end of said support flange;
said platform including a pair of roller connection members, each roller connection member extending outwardly from a respective side of said platform in alignment with an associated one of said pair of tracks whereby a distal end of said roller connection member is positioned for contacting an associated one of said stopping portions;
a roller assembly extending between said roller connection members such that said roller assembly is supported by said support flanges of said pair of tracks for facilitating extension and retraction of said platform;
said platform having a pair of ladder connection members extending outwardly from said platform, said ladder being pivotally coupled to said ladder connection members;
each of said ladder connection members having an upper flange extending orthogonally outward from said platform such that said upper flange extends past a proximal end of said ladder when said ladder is coupled to said ladder connection member, said upper flange being coplanar with an upper surface of said platform for preventing said distal end of said ladder from pivoting above a horizontal plane in which said platform lies;
said tracks each including a respective securing aperture;
said ladder including a pair of holes, said holes being alignable with said securing apertures when said ladder is in said retracted position;
a fastener assembly for extending through said securing apertures and ladder holes for holding said ladder in said retracted position during periods of non-use;
said fastener assembly including a pin member for inserting through an associated aligned securing aperture and ladder hole, said pin member having a receiving hole extending through a distal end of said pin member;
a clip member insertable through said receiving hole whereby said pin member is engagable to said ladder and said track for holding said ladder in a static position;
said ladder including a pair of spaced legs and a pair of pin receiver plates, each pin receiver plate extending outwardly from an associated one of said legs;
each said hole in said ladder being located in a respective one of said pin receiver plates; and
a plurality of generally L-shaped mounting brackets coupling said tracks to the underside of the bottom wall of the elevated compartment of the camper.

* * * * *